Feb. 7, 1961

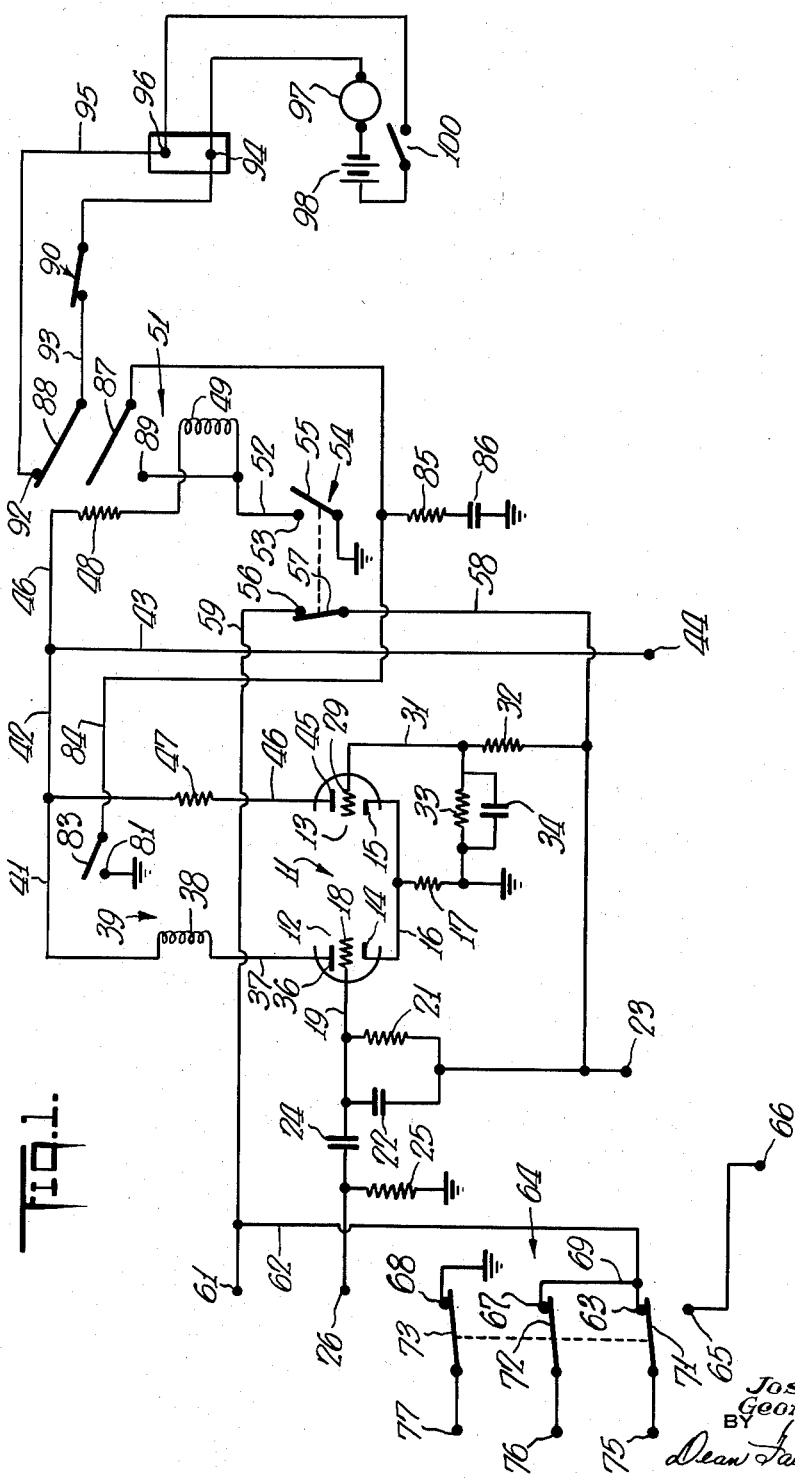

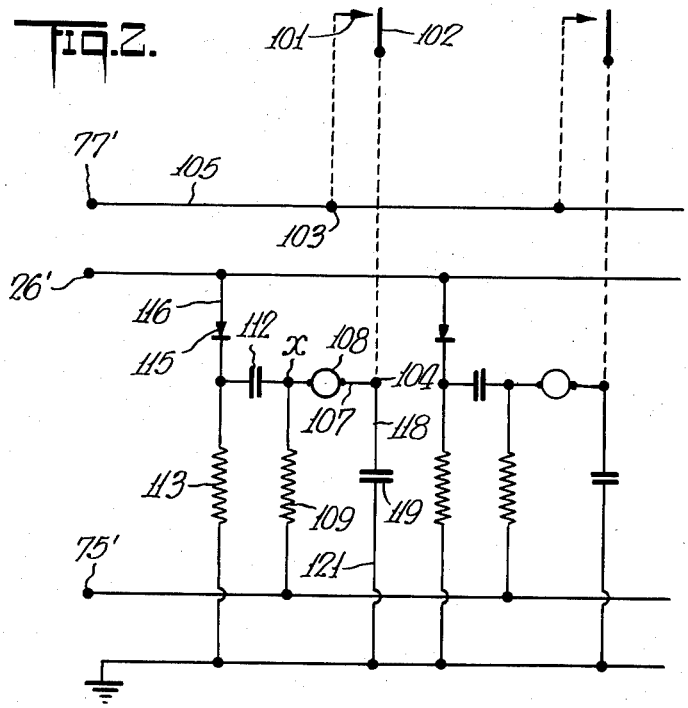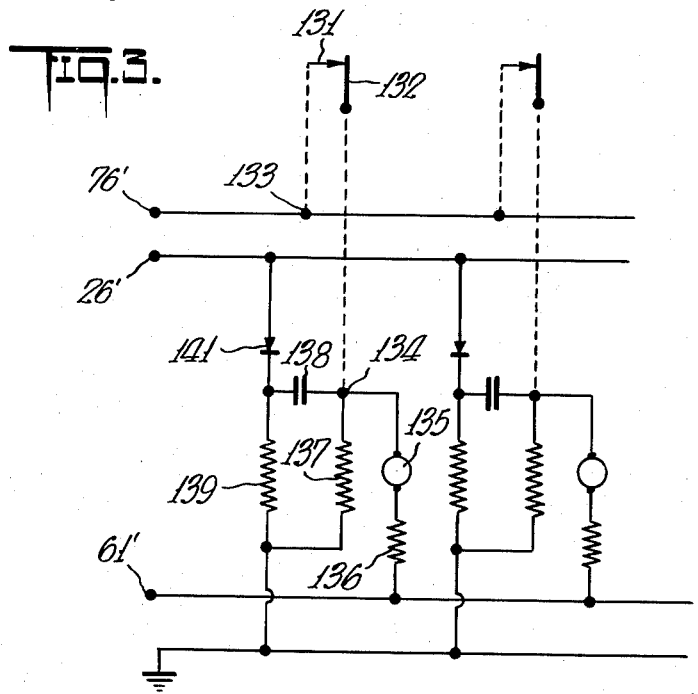

J. GILL ET AL 2,971,183

MONITORING EQUIPMENT

Filed June 11, 1956

3 Sheets-Sheet 3

INVENTORS
Joseph Gill
George Gruendel
BY
Dean Fairbank & Hirsch
ATTORNEYS

United States Patent Office 2,971,183
Patented Feb. 7, 1961

2,971,183
MONITORING EQUIPMENT

Joseph Gill, Hicksville, and George Gruendel, Long Island City, N.Y., assignors, by mesne assignments, to Hagan Chemicals & Controls, Inc., Pittsburgh, Pa., a corporation of Pennsylvania Filed June 11, 1956, Ser. No. 590,510

7 Claims. (Cl. 340—213)

This invention relates to the art of monitoring equipment, more particularly of the type to provide an indication at a remote point when any of a plurality of conditions being monitored has attained a predetermined value.

It is among the objects of the invention to provide a monitoring equipment which is compact and sturdy and utilizes relatively low cost components which consume but little current and which, regardless of the number of test points, requires but few moving parts that are not likely to become deranged, which equipment will dependably and automatically provide an indication to identify which of the plurality of conditions under supervision has attained a critical value.

Another object is to provide an equipment of the above type which will provide a visual indication of which point under test has attained a critical condition and which will retain such indication even if the critical condition was momentary and which will also provide an audible indication when a critical condition has been attained.

According to the invention from its broader aspect, the equipment comprises an indicating unit and an amplifier and alarm unit. The amplifier and alarm unit includes a vacuum tube which, when energized, will conduct to energize a relay that controls the circuit to an audible alarm such as a buzzer to retain such alarm deenergized. The indicating unit is controlled by contacts associated with each of the points under test and when said contacts are actuated, a neon lamp will be energized to provide a negative pulse through related circuits which will bias the vacuum tube to de-energize said relay to actuate the alarm.

More specifically, the indicating unit has a control device such as a thyratron which, when initially energized by the actuation of the associated contacts will complete a circuit to energize the neon lamp. The thyratron will thereupon remain energized even if the actuation of the contacts should be momentary so that the neon lamp will remain illuminated.

Figure 5:
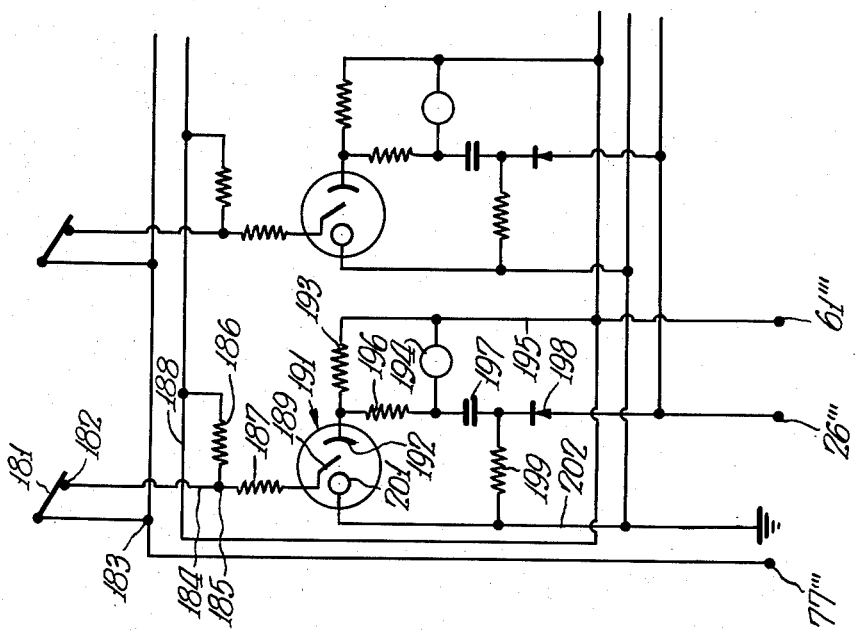
Figure 4:
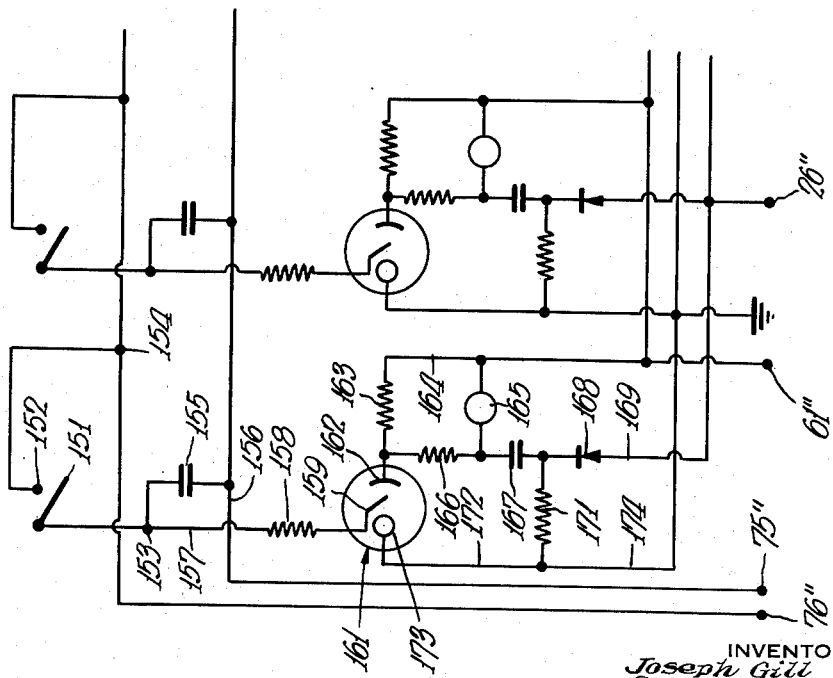

In the accompanying drawings in which are shown one or more of various possible embodiments of the several features of the invention, Fig. 1 is a circuit diagram of the amplifier and alarm unit, Fig. 2 is a circuit diagram of one embodiment of the indicating unit utilizing normally open contacts, Fig. 3 is a circuit diagram of an embodiment of the indicating unit utilizing normally closed contacts, Fig. 4 is a circuit diagram of an embodiment of the indicating unit utilizing normally open contacts and having means to retain the information of momentary closure of such contacts, and Fig. 5 is a circuit diagram of an embodiment of the indicating unit utilizing normally closed contacts and having means to retain the information of momentary opening of such contacts.

Referring now to the drawings, the amplifier and alarm unit of the equipment shown in Fig. 1, desirably comprises a differential amplifier 11 which has a pair of vacuum tubes 12 and 13, illustratively of the triode type, which may be contained in a single envelope. The cathodes 14 and 15 of tubes 12 and 13 are connected together by lead 16 and thence through resistor 17, which serves as a common cathode resistor, to ground. The grid 18 of tube 12 is connected by lead 19 through parallel connected resistor 21 and capacitor 22 to terminal 23 to which is connected, for example, a 150 volt D.C. source. Lead 19 is also connected through coupling capacitor 24 and resistor 25 to ground and to alarm terminal 26. The grid 29 of tube 13 is connected by lead 31 through resistor 32 to terminal 23 and through resistor 33, which is shunted by capacitor 34, to ground, the resistors 32 and 33 forming a voltage divider.

The plate 36 of tube 12 is connected by lead 37 to one side of coil 38 of relay 39, the other side of said coil being connected by leads 41, 42 and 43 to terminal 44 to which is connected, for example, a 400 volt D.C. source of power. The plate 45 of tube 13 is connected by lead 46 through a resistor 47 and leads 42 and 43 to said terminal 44. The lead 41 is also connected through leads 42 and 46, resistor 48 to one side of the coil 49 of a relay 51, the other side of said coil being connected by lead 52 to the fixed contact 53 of a pushbutton switch 54, the contact arm 55 of which is normally spaced from fixed contact 53 and connected to ground. The switch 54 has a second pair of contacts including a fixed contact 56 and a contact arm 57 normally engaging contact 56 and ganged to moved with the contact arm 55. The switch is of the type that when released after actuation contacts 56, 57 make before contacts 53, 55 break. The contacts arm 57 is connected by lead 58 to terminal 23 and the fixed contact 56 is connected by lead 59 to terminal 61 and by lead 62 to the fixed contact 63 of a multiple switch 64 which serves for lamp testing in the manner to be described. Switch 64 has an additional fixed contact 65 associated with contact 63 and connected to terminal 66 to which is connected, for example, a 350 volt A.C. source of power, and two other fixed contacts 67 and 68, the former being connected by lead 69 to fixed contact 63, and the latter being connected to ground. Switch 64 has three contact arms 71, 72 and 73 ganged to move in unison, the contact arms 71, 72 and 73 normally engaging fixed contacts 63, 67 and 68 and being connected to associated terminals 75, 76 and 77.

The relay 39 has a fixed contact 81 connected to ground and normally engaged by a contact arm 83 when the coil 38 of relay 39 is energized. Contact arm 83 is connected by lead 84 through resistor 85 and capacitor 86 to ground and also to the contact arm 87 of relay 51.

The relay 51 has in addition to contact arm 87 a contact arm 88 ganged to move therewith. The contact arm 87 normally engages the fixed contact 89 of relay 51 when the coil 49 of said relay is energized and said fixed contact 89 is connected to lead 52. The contact arm 88 of relay 51 normally engages fixed contact 92 and is spaced therefrom when the relay 51 is energized. The contact arm 88 is connected by lead 93 through normally closed switch 90 to a terminal 94 and the fixed contact 92 is connected by lead 95 to a terminal 96 associated with terminal 94. The terminal 94 is connected to one side of an alarm such as a buzzer 97, the other side of which is connected through a battery 98, for example, and normally open switch 100 to terminal 96.

The amplifier and alarm unit shown in Fig. 1 may be used in association with several different types of indicator units. Thus, for example, the indicator unit shown in Fig. 2 of the drawings is designed for use with a multiplicity of transducers such as thermometers, for example, each of which has a pair of normally open contacts 101 and 102, designed to close, illustratively when a predetermined temperature has been attained. As the circuits associated with each pair of contacts are identical, only will be described in detail.

The contacts 101 and 102 are connected respectively to terminals 103 and 104, the former being connected by lead 105 to terminal 77'. The terminal 104 is connected by lead 107 to one side of a neon lamp 108, the other side of which is connected through resistor 109 to terminal 75' and also to one side of a capacitor 112, the other side of which is connected through resistor 113 to ground and to the negative side of a rectifier 115, desirably a diode semi-conductor, the positive side of which is connected by lead 116 to alarm terminal 26'. The terminal 104 is also connected by lead 118 to one side of a capacitor 119, the other side of which is connected by lead 121 to ground.

In the operation of the equipment, with the units shown in Figs. 1 and 2, the terminals 77 and 77', 26 and 26' and 75 and 75' are connected respectively.

When the system is initially energized, 150 volts will be applied to the grid 18 of tube 12 through resistor 21. As the grid 29 of tube 13 is connected through resistor 33 to ground and through resistor 32 to the 150 volt source, the voltage dividing action provided by said two resistors 32, 33 will cause the voltage applied to grid 29 to be in the order of 140 volts. Consequently, the tube 12 will conduct much more heavily than tube 13 and by reason of the common cathode resistor 17, the grid 29 of tube 13 will be biased sufficiently so that such tube will be cut off.

As the result of the conduction of tube 12, current will flow through the coil 38 of relay 39, lead 41, 42, 43 to terminal 44 to energize relay 39. Consequently, contact arm 83 will engage fixed contact 81 to connect contact arm 87 of relay 51 to ground. However as relay 51 is not yet energized and contact arm 87 is spaced from fixed contact 89, this will have no effect.

As soon as the power supply is turned on and switch 100 is closed, as relay 51 is normally not energized, the contact arm 88 will have been engaging fixed contact 92 to complete a circuit to the alarm buzzer 97 through the closed switch 100 which is ganged with the main power switch (not shown). Consequently, the buzzer will be energized to indicate that it is functioning. Thereupon, the operator need only press the pushbutton switch 54 so that the contact arm 55 thereof momentarily engages fixed contact 53 to complete a circuit from ground through lead 52, the coil 49 of relay 51, resistor 48 and leads 46 and 43 to power terminal 44. As a result, the relay 51 will be energized so that the contact arm 87 thereof will engage fixed contact 89 to provide a holding circuit for said relay through lead 84 and closed contacts 83, 81 of energized relay 39 to ground. In addition, the energization of relay 51 will cause contacts 88, 92 to open to break the circuit to the alarm buzzer 97 through closed power switch 100.

With the system thus energized it is apparent that the 150 volt terminal 23 will be connected through lead 58, normally closed contacts 56, 57 of switch 54, lead 59, 62, closed contacts 63, 71 of switch 64, terminal 75, terminal 75' (Fig. 2) through resistor 109 to the junction X between neon lamp 108 and capacitor 112. As the other side of the capacitor 112 is connected through resistor 113 to ground, the capacitor will charge to 150 volts. As the other side of the neon lamp is connected through lead 107 to the contact 102 which is normally spaced from the contact 101, and to one side of the capacitor 119, there will be no current flow through the lamp 108 and hence it will not be illuminated.

If at this time, due to a rise in temperature, for example, the contacts 101, 102 should close, current will flow from junction X which is at a 150 volt potential, through lamp 108, closed contacts 101, 102, lead 105 to terminal 77' which is connected to terminal 77 of unit 1 and thence through closed contacts 73, 68 to ground. As a result of such current flow through lamp 108, the gas therein will ionize and the lamp will become illuminated.

As a result of the voltage drop across lamp 108 which, say, is in the order of 60 volts, condenser 112 will discharge and a negative pulse will be developed which will pass through the rectifier 115 to terminal 26' and thence to terminal 26 of unit 1, through coupling capacitor 24 and lead 19 to the grid 18 of tube 12. The negative pulse will also cause the condenser 22 to discharge until it attains a voltage thereacross of 90 volts. As a result of the negative pulse of 60 volts applied to the grid 18 of tube 12, the grid voltage will be driven below 140 volts so that the current flow through tube 12 will decrease as will the voltage drop across cathode resistor 17 to reduce the bias on tube 13. As the grid voltage of tube 13 which is 140 volts will now be above that of tube 12, tube 13 will immediately start to conduct causing additional current to flow through resistor 17 which will provide additional positive potential on the cathode 14 of tube 12 to render the grid 18 thereof more negative to insure rapid cutoff of such tube 12 to de-energize the relay 39. As a result, contacts 83, 81 of relay 39 will open to break the holding circuit for the coil of relay 51. Thus, relay 51 will de-energized and contact arm 88 will engage contact 92 to complete a circuit to the alarm buzzer 97. Thus, the attendant will have a visual indication, i.e., the lamp 108 and an audible indication, i.e., the buzzer 97 that one of the points under test has reached a critical condition.

As soon as the negative pulse has passed, the capacitor 22 will again recharge to 150 volts and such voltage will also be applied to grid 18 of tube 12. Since the voltage on grid 29 is still 140 volts, tube 12 will again conduct to energize the relay 39 and tube 13 will be cut off. However, as the contacts 87, 89 of relay 51 are open as are the contacts 53, 55 of switch 54, the relay 51 will remain de-energized and as contacts 88, 92 of relay 51 are closed, the alarm buzzer 97 will remain energized.

The operator need merely momentarily press the pushbutton switch 54 to complete a circuit from ground through the coil 49 of relay 51 to terminal 44 to again energize said relay to break the circuit to the alarm buzzer 97. In addition, the closing of switch 54 will cause contacts 56, 57 thereof to open to break the circuit from the 150 volt source to terminal 75 which is connected to terminal 75' and to the junction X between capacitor 112 and lamp 108. As the result of the opening of said circut no potential will be applied to the lamp 108 and the latter will be de-energized.

Upon release of the pushbutton switch 54 if the switch contacts 101, 102 are still closed, the operation previously described will again repeat and the lamp 108 will become illuminated again. This will indicate to the operator that the closure of contacts 101, 102 is not momentary but due to a definite condition existing that must be attended to.

The embodiment of the indicator unit shown in Fig. 3 is similar in many respects to that shown in Fig. 2, but is designed for use with a pair of normally closed contacts 131 and 132 connected respectively to terminals 133 and 134, the former being connected to terminal 76'. The terminal 134 is connected to one side of a neon lamp 135, the other side of which is connected through resistor 136 to terminal 61'. Terminal 134 is also connected through resistor 137 to ground and to one side of a capacitor 138, the other side of which is connected through resistor 139 to ground and to the negative side of a diode rectifier 141, the positive side of which is connected to the alarm terminal 26'.

In the operation of the equipment with the units shown in Figs. 1 and 3, the terminals 76 and 76', 26 and 26', and 61, 61' are connected respectively. When the system is initially energized, the relays 39 and 51 will operate as previously described. The contact 131 will be connected through terminals 76' and 76 (Fig. 1), closed contacts 72, 67 of switch 64, lead 69, contact 63, leads 62, 59, through the normally closed contacts 56, 57 of switch 54, lead 58 to terminal 23 which is connected to 150 volt source. Consequently, as contact 131 is engaged by contact arm 132, the terminal 134 will be connected to the 150 volt source. In addition, the terminal 61', which is connected to terminal 61 (Fig. 1) is also connected through leads 59 and 58 to the 150 volt source. Hence, 150 volts will be applied to both sides of the neon lamp 135 and the latter will not be energized. By reason of the 150 volts applied to terminal 134 and to one side of capacitor 138, as its other side is connected to ground through resistor 139, the capacitor will charge to 150 volts upon application of potential thereto.

When the contacts 131 and 132 open upon a critical condition being reached, such as the temperature rising above a predetermined amount, the circuit from the 150 volt source to terminal 134 will be broken. Hence, as there is 150 volts applied to one side of the neon lamp 135 through terminal 61' and as the other side is connected through resistor 137 to ground, the difference of potential across the neon lamp will cause the gas therein to ionize and the lamp to become illuminated. As a result of the current flow through the lamp 135 there will be a voltage drop thereacross and the capacitor 138 which is initially charged to 150 volts will discharge. Thus, a negative pulse will be provided in the order of say 60 volts, which will be transmitted through rectifier 141 to alarm terminal 26' and thence to terminal 26 (Fig. 1). The circuit shown in Fig. 1 will thereupon operate in the manner previously described to effect energization of alarm buzzer 97 to provide an audible alarm. By momentary operation of the pushbutton switch 54, as previously described, the alarm buzzer 97 will be cut off and the 150 volt supply to both sides of the neon lamp cut off. If the contacts 131 and 132 still are closed when the switch 54 is released, the conditions previously described will again be in effect and the neon lamp again will become illuminated, indicating that there is a critical condition reached.

With the indicator units shown in Figs. 2 and 3, in the event that one of the pairs of contacts 101, 102 or 131, 132 should momentarily close or open, as the case may be, an audible alarm will be given, but upon opening or closing of said contacts respectively thereafter, the associated lamp will immediately go out so that the attendant has no means of knowing which of the particular points being supervised has momentarily attained such critical condition. The units shown in Figs. 4 and 5 are designed to provide a memory so that even if the contacts should open or close momentarily as the case may be, the indicating lamp associated therewith will remain illuminated until the attendant closes an acknowledge switch in the manner to be described.

Referring to Fig. 4, the unit therein shown has a pair of normally open contacts 151, 152 connected respectively to terminals 153 and 154. The terminal 154 is connected to terminal 76" and the terminal 153 is connected through capacitor 155 and lead 156 to terminal 75" and also through lead 157 and resistor 158 to the control electrode 159 of a cold cathode type thyratron 161. The positive electrode 162 of the thyratron is connected through resistor 163 and lead 164 to terminal 61" and also to one side of the neon lamp 165. The positive electrode 162 is also connected through resistor 166 to the other side of the neon lamp and through capacitor 167 to the negative side of a diode rectifier 168, the positive side of which is connected by lead 169 to terminal 26". The negative side of the rectifier 168 is also connected through resistor 171 and lead 172 to the negative electrode 173 of the thyratron and by lead 174 to ground.

In the operation of the equipment with the units shown in Figs. 1 and 4, the terminals 76 and 76", 75 and 75", 61 and 61" and 26 and 26" are connected. When the system is energized as terminal 61" is connected to the 150 volt source, such potential will be applied to one side of the neon lamp 165 as well as to the positive electrode 162 of the thyratron 161. In addition, such potential will be applied to one side of the capacitor 107 and as the other side of the capacitor is connected through resistor 171 and lead 174 to ground, the capacitor will instantaneously charge to 150 volts. Thus, there will be 150 volts on both sides of the neon lamp 165 and the latter will not be illuminated. Although there is 150 volts on the positive electrode 162 of the thyratron, and the negative electrode 173 thereof is connected by leads 172 and 174 to ground, such 150 volt difference of potential is not sufficient to cause ionization of the thyratron.

If the contacts 151 and 152 should close due to the attainment of the critical condition, as the terminals 153 and 154 will be connected, 150 volt potential will be applied to the control electrode 159 of the thyratron from terminal 76" through closed contacts 151 and 152, lead 157 and resistor 158. As a result, the gas in the thyratron will ionize and the thyratron will conduct. As a result of such conduction, current will flow through resistor 163 and through the thyratron to ground and there will be a drop in potential at the plate or positive electrode 162 of such thyratron. Due to such drop in potential which will also appear on the corresponding side of the neon lamp 165, there will be a difference of potential across the lamp and the latter will ionize and become illuminated. Due to such drop in potential the capacitor 167 will discharge and a negative pulse will pass through the rectifier 168 to terminal 26" and thence to terminal 26 of the amplifier and alarm unit to cause the latter to operate in the manner previously described.

If the contacts 151, 152 should immediately open, the 150 volt potential applied to the control electrode 159 of the thyratron 161 will be cut off. However, as the thyratron when once conducting will remain conducting until the potential applied to its positive electrode 162 is cut off, the thyratron will remain conducting and hence the difference of potential across the neon lamp will be sufficient to maintain the latter ionized so that it will remain illuminated thus providing an indication to the attendant that some critical condition has been reached even though the contacts have again been restored to their normal condition, i.e., opened in the illustrative example shown in Fig. 4.

The embodiment of the indicator unit shown in Fig. 5 is similar in many respects to that shown in Fig. 4, but is designed for use with a pair of normally closed contacts 181, 182 connected respectively to terminals 183, 184. The terminal 183 is connected to terminal 77''' and the terminal 184 is connected to the junction 185 between resistors 186, 187, the other ends of said resistors being connected respectively by line 188 to terminal 61''' and to the control electrode 189 of the thyratron 191. The positive electrode 192 of the thyratron is connected through resistor 193 to one side of the neon lamp 194 and by lead 195 to terminal 61'''. The positive electrode is also connected through resistor 196 to the other side of the neon lamp 194 and through capacitor 197 to the negative side of diode rectifier 198, the positive side of which is connected to terminal 26'''. The negative side of the rectifier is also connected through resistor 199 to the negative terminal 201 of the thyratron and by lead 202 to ground.

In the operation of the equipment, with the units shown in Figs. 1 and 5, the terminals 77''' and 77; 26''' and 26 and 61''' and 61 are connected. When the system is energized, the 150 volt potential from terminal 61''' will be returned to ground through lead 188, resistor 186, closed contacts 181 and 182, terminals 77''' and 77 and closed contacts 73, 68 of switch 64. As one side of the neon lamp 194 is connected to the terminal 61''', 150 volts will be applied to such side and also to the positive electrode 192 of thyratron 191 and to one side of the capacitor 197 which will charge to 150 volts since the other side is connected to ground. As the neon lamp 194 will thus have 150 volts on each side thereof it will not ionize and hence will not be illuminated. Although the positive electrode 192 of the thyratron 191 will have 150 volts applied thereto it still will not conduct as a differential of 150 volts is not sufficient to cause ionization of the gas therein.

When the normally closed contacts 181 and 182 open, due to a critical condition being obtained, the ground path of the 150 volt potential at the junction 185 between resistors 186 and 187 will be open and hence 150 volts will be applied to the control electrode 189 of the thyratron. As a result, the thyratron will fire and there will be current flow therethrough, which will cause the voltage at the positive electrode 192 to drop due to the drop across resistor 193. Hence the voltage applied to one side of the neon lamp 194 will be, say, 90 volts and the voltage on the other side 150, such differential being sufficient to cause ionization of the gas in said tube and the illumination thereof. Due to such voltage drop the capacitor 197 discharge and the negative pulse will pass through the rectifier 198 to terminal 26''' and thence to terminal 26 of the amplifier and alarm unit to cause the latter to operate in the manner previously described.

If the contacts 181, 182 should immediately open, although the positive potential applied to the control electrode 189 of the thyratron 191 will again be cut off, the thyratron will remain conducting so long as potential is applied to the positive electrode thereof and hence the neon lamp will remain illuminated.

By reason of the memory provided by the units shown in Figs. 4 and 5, the attendant need not keep constant watch of the lamps, but as soon as the alarm buzzer goes off he will be able to inspect the panel (not shown) on which the lamps 165 or 194 are mounted to determine which of the points under test has attained a critical condition. To determine whether such condition was momentary it is merely necessary to operate the switch 54 to break the circuit from the power terminal 23 to the neon lamp and to the thyratron to cause them to be de-energized. If the condition was only momentary and the contacts 151, 152 or 181, 182 opened before release of the switch 54, the thyratron will remain de-energized and hence the lamp 165 or 194 will not become illuminated. However, as the attendant was able to see which of the conditions under test had momentarily attained such critical condition, he will be able to pay especial attention to such point and if another momentary critical condition is reached, take necessary steps to determine the cause.

The amplifier and alarm unit shown in Fig. 1 is capable of use with any of the indicating units shown in Figs. 2 to 5 inclusive. As previously described, as soon as the equipment is energized, the alarm buzzer 97 will also be energized which will indicate that it is in operative condition.

The neon lamps in each of the embodiments shown may also be tested by the operation of the switch 64 to open contacts 68, 73; 67, 72 and 63, 71 and to close contacts 65, 71. The closing of said last pair of contacts will cause an alternating current potential sufficient to energize the neon lamps to be applied to terminal 75.

Thus, referring to Fig. 2, such alternating current potential will be applied to terminal 75' and through resistor 109, neon lamp 108 and capacitor 119 to ground to energize the lamp. Referring to Fig. 3, terminal 75 is not connected. However, when contacts 67, 72 of switch 64 are opened, there will be positive potential applied to only one side of lamp 135 and hence it will be energized.

In Fig. 4 as the closing of contacts 65, 71 (Fig. 1) will connect the alternating current potential to terminal 75'', such potential will be applied through capacitor 155 and resistor 158 to the control electrode 159 of the thyratron 161. As a result, the thyratron will fire causing the neon lamp 165 to be illuminated in the manner previously described. The lamp may then be turned off by actuating the switch 54 (Fig. 1) to break the power circuit to the positive electrode 162 of the thyratron.

With respect to the embodiment of Fig. 5, opening of the contacts 68, 73 (Fig. 1) will also open the ground return path for the positive potential applied from terminal 61''' (Fig. 5) to the control electrode 189 of thyratron 191. Thus, the thyratron will fire causing the lamp 194 to be illuminated, and such lamp can also be turned off by actuating the switch 54 (Fig. 1).

With the use of the neon lamps above described, as the indicating elements of the indicating units shown in Figs. 2, 3, 4 and 5, the equipment will draw very little current as compared to that required if conventional incandescent lamps were used. This is extremely important especially where a large number of test points are to be supervised, as it dispenses with the need of a large power supply and by reason of the relatively long life of the neon lamps, maintenance is kept at a minimum.

The equipment does not require the use of a separate relay for each test point but only a relatively small diode semi-conductor which serves as a rectifier to pass the negative pulses. As there are no moving parts the likelihood of breakdown is kept to a minimum, as is the need for maintenance.

The equipment, as illustratively shown, requires but two relays regardless of the number of test points so that the number of moving parts is kept to a minimum, also reducing likelihood of breakdown and minimizing maintenance.

With the use of the differential amplifier, only relatively small amplitude negative pulses are required to affect actuation of the control relay in the plate circuit of the first vacuum tube. Thus, even with ageing of the vacuum tubes or variations in the pulse value due to changes in the resistance of the neon lamp, the amplitude of the negative pulse would still be sufficient to cause the second tube of the differential amplifier to take control to deenergize the relay in the plate circuit of the first tube.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. Equipment for monitoring a test point having a pair of contacts actuated when said test point has attained a critical condition, said equipment comprising a neon lamp controlled by such contacts and normally retained in de-energized condition, a capacitor having one side connected to one side of said lamp for charging of said capacitor to the potential applied to said side of the lamp, a discharge circuit for said capacitor, an output terminal, a rectifier in series with said capacitor and said output terminal, means controlled by the actuation of such contacts to apply a difference of potential across said lamp to energize the latter, whereby said capacitor will discharge through said discharge circuit to cause a negative pulse to be applied through said rectifier to said output terminal.

2. Equipment for monitoring a test point having a pair of normally open contacts adapted to close when said test point has attained a critical condition, said equipment comprising a neon lamp, a capacitor having one side connected to one side of said lamp, an output terminal, a rectifier having its positive side connected to said output terminal and its negative side connected to the other side of said capacitor, a resistor connected at one end to the negative side of said rectifier and at its other end to a common return, a power terminal, a second resistor connected at one end to the side of the capacitor connected to the lamp and at its other end to said power terminal, and means for connecting such contacts to the common return and to the other side of said neon lamp respectively.

3. Equipment for monitoring a test point having a pair of normally closed contacts adapted to open when said test point has attained a critical condition, said equipment comprising a neon lamp, a capacitor having one side connected to one side of said lamp, an output terminal, a rectifier having its positive side connected to said output terminal and its negative side connected to the other side of said capacitor, a resistor connected at one end to the negative side of said rectifier and at its other end to a common return, a power terminal, a second resistor connected at one end to said power terminal and at its other end to the other side of said neon lamp, a third resistor connected at one end to said common return and at its other end to the first side of said neon lamp and means for connecting such contacts to said first side of the neon lamp and to a source of potential respectively.

4. Equipment for monitoring a test point having a pair of normally open contacts adapted to close when said test point has attained a critical condition, said equipment comprising a neon lamp, a capacitor having one side connected to one side of said lamp, an output terminal, a rectifier having its positive side connected to said output terminal and its negative side connected to the other side of said capacitor, a thyratron control tube having a negative electrode, a positive electrode and a control electrode, a resistor connected at one end to the negative side of said rectifier and at its other end to the negative electrode of said thyratron and to a common return, a power terminal, a second and third resistor each having one end connected to the positive electrode of said thyratron, the other end of said second resistor being connected to the other side of said neon lamp and to said power terminal and the other end of said third resistor being connected to the first side of said neon lamp, a second power terminal, a second capacitor, means connecting said second power terminal to one side of said second capacitor, an additional resistor connected at one end to said control electrode, means connecting the other end of said additional resistor to the other side of said second capacitor and means connecting such contacts to said other side of said second capacitor and to a source of potential respectively.

5. Equipment for monitoring a test point having a pair of normally closed contacts adapted to open when said test point has attained a critical condition, said equipment comprising a neon lamp, a capacitor having one side connected to one side of said lamp, an output terminal, a rectifier having its positive side connected to said output terminal and its negative side connected to the other side of said capacitor, a thyratron control tube having a negative electrode, a positive electrode and a control electrode, a resistor connected at one end to the negative side of said rectifier and at its other end to the negative electrode of said thyratron and to a common return, a power terminal, a second and third resistor each having one end connected to the positive electrode of said thyratron, the other end of said second resistor being connected to the other side of said neon lamp and to said power terminal, and the other end of said third resistor being connected to the first side of said neon lamp, an additional resistor connected at one end to the control electrode of said thyratron, a second additional resistor connected at one end to said power terminal, means connecting said additional resistors in series and means connecting such contacts to the junction between said additional resistors and to a common return respectively.

6. Equipment for monitoring a plurality of test points, each having a pair of contacts actuated when the associated test point has attained a critical condition, said equipment comprising a neon lamp controlled by such contacts and normally retained in de-energized condition, means controlled by the actuation of such contacts to apply a difference of potential across said lamps to energize the latter, an output terminal, means controlled by the energization of such lamps to deliver a negative pulse to said output terminal, a vacuum tube, a relay controlled by said vacuum tube, means connecting said output terminal to said vacuum tube to effect actuation of said relay upon application of a negative pulse thereto and an audible alarm controlled by said relay.

7. The combination recited in claim 6 in which means are provided to energize said neon lamp independently of the actuation of such test point contacts.

References Cited in the file of this patent

UNITED STATES PATENTS

| | | |
|---|---|---|
| 1,673,369 | Mills | June 12, 1928 |
| 1,693,725 | Nelson | Dec. 4, 1928 |
| 2,345,042 | Frundt | Mar. 28, 1944 |
| 2,461,962 | Carlson | Feb. 15, 1949 |
| 2,547,011 | Jacobsen | Apr. 3, 1951 |
| 2,556,363 | Lord et al. | June 12, 1951 |
| 2,695,400 | Snitjer | Nov. 23, 1954 |
| 2,730,703 | Ross | Jan. 10, 1956 |
| 2,759,177 | Hightower | Aug. 14, 1956 |
| 2,791,473 | Mattox | May 7, 1957 |
| 2,907,013 | Little | Sept. 29, 1959 |